United States Patent [19]

Saari

[11] 4,212,111

[45] Jul. 15, 1980

[54] SNOWMOBILE CLUTCH ADJUSTING TOOL

[76] Inventor: Stanley T. Saari, Box 3616, R.R. #2, Clearwater, British Columbia, Canada, V0E 1N0

[21] Appl. No.: 965,931

[22] Filed: Dec. 4, 1978

[30] Foreign Application Priority Data

Mar. 22, 1978 [CA] Canada .................................. 299572

[51] Int. Cl.² .............................................. G01B 5/25
[52] U.S. Cl. ........................... 33/181 R; 33/181 AT
[58] Field of Search ................ 33/181 R, 412, 180 R, 33/180 AT, 181 AT, 169 R, 174 Q, 178 D, 286

[56] References Cited

U.S. PATENT DOCUMENTS

| | | | |
|---|---|---|---|
| 2,201,935 | 5/1940 | Turrettini | 33/181 |
| 2,435,085 | 1/1948 | Judd | 33/180 R |
| 2,821,788 | 2/1958 | Wendt | 33/181 AT |
| 3,525,158 | 8/1970 | Torlay | 33/180 R |

*Primary Examiner*—Willis Little
*Attorney, Agent, or Firm*—Christie, Parker & Hale

[57] ABSTRACT

A tool for aligning sheaves or the like rotatable about spaced-apart parallel axes of rotation. The tool comprises an elongate member for extending between two sheaves generally perpendicular to the axes of rotation. There is a first contacting means generally near a first end of the elongate member for contacting a first sheave. There is a second contacting means generally near a second end of the elongate member for contacting a second sheave. The second contacting means comprises at least two gauge members extending from one side of the elongate member. Each gauge member comprises indicating means for indicating a distance between the elongate member and the second sheave.

11 Claims, 6 Drawing Figures

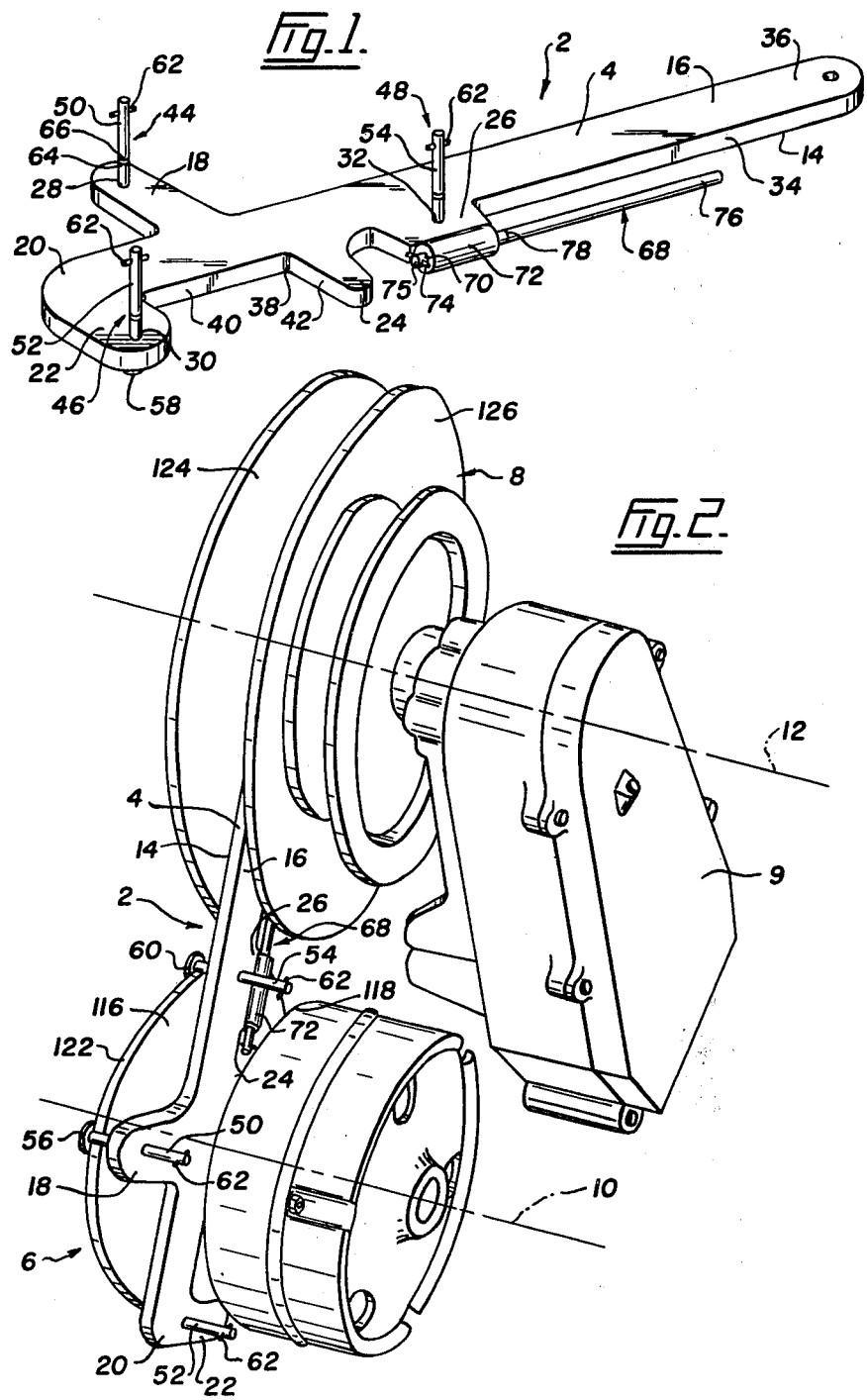

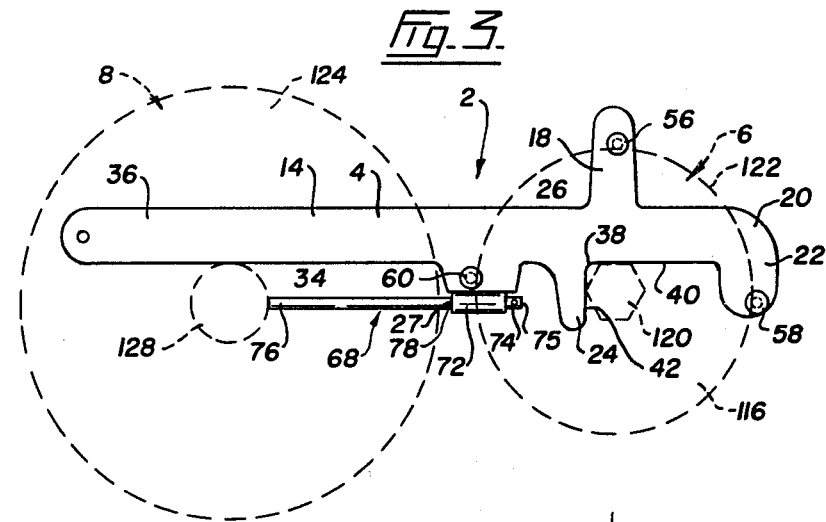
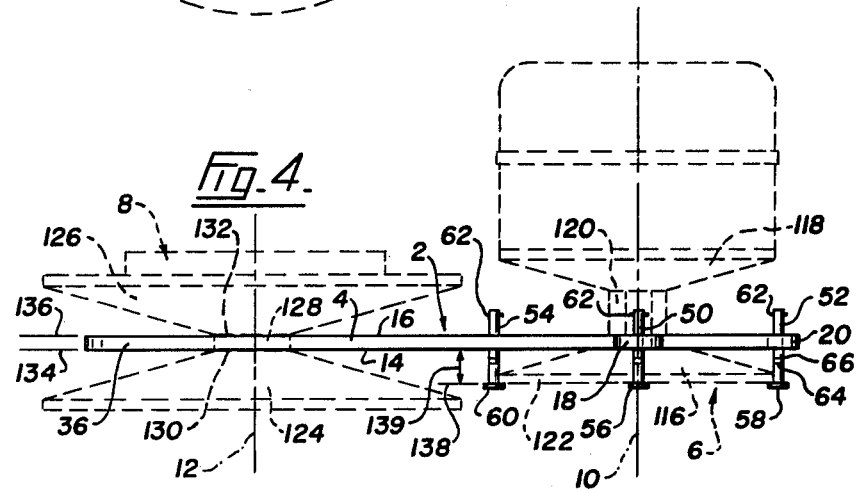
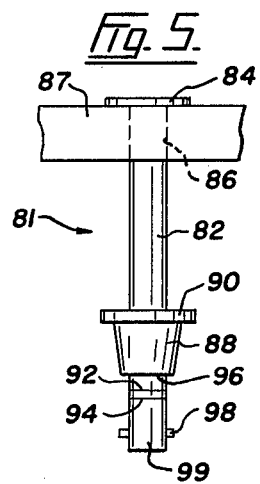
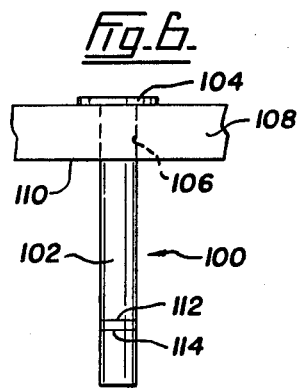

SNOWMOBILE CLUTCH ADJUSTING TOOL

BACKGROUND OF THE INVENTION

This invention relates a tool for aligning sheaves or the like rotatable about spaced-apart parallel axes of rotation.

Many types of mechanical systems involve the use of two or more sheaves, pulleys or the like which are rotatable about spaced-apart parallel axes of rotation. In some such systems, it is often periodically necessary to align the sheaves or pulleys. Alignment between any two sheaves is generally assured in three different ways: (1) by assuring the axes of rotation of the two sheaves are spaced apart within given tolerances; (2) by assuring that planes perpendicular to the axis of rotation of each sheave are parallel, this being equivalent to the axes of rotation of the two sheaves being parallel; and (3) by assuring alignment along the axes of rotation.

An example of such a mechanical system is the drive system of a snowmobile consisting in part of the drive clutch, drive belt, and driven pulley. The drive system used in the Arctic Cat TM snowmobile, for example, uses a torque sensing, sheave-type, variable ratio drive clutch and driven pulley. The combination of the drive clutch, drive belt and driven pulley acts an automatic transmission. The drive ratio between the engine and the track of the snowmobile is governed by the radial position of the drive belt on the drive clutch and driven pulley respectively. The drive belt is a cogged v-belt and the drive clutch and driven pulley include v-shaped grooves for the drive belt similar to common v-belt sheaves. However, in the case of the snowmobile drive system, the sheaves each comprise two halves, one half to each side of the drive belt. As the two sides of a sheave move closer together, the drive belt moves radially outwards on the sheave and, as the halves of the sheaves move farther apart, the drive belt moves radially towards the axis of rotation of the sheave. When the snowmobile is starting off and during heavy loading, the halves of the drive clutch are spaced apart the maximum distance and the halves of the driven pulley are closest together. During high speed cruising and light loading, the halves of the drive clutch are closest together and the halves of the driven pulley are furthest apart. In this way the ratio of the drive clutch and driven pulley is variable between, for example, 3.79:1 and 1:1 for the two cases just described.

In the past, proper alignment of the drive clutch and driven pulley has been considered a frustrating and time consuming operation. The recommended approach involves the use of a straight clutch alignment bar with parallel faces. With the drive belt removed, one end of the clutch alignment bar was inserted between parallel faces of the two halves of the driven pulley. The other end of the bar was placed on a small block on the shaft of the drive clutch. Measurements were then made from a face of the clutch alignment bar to certain portions of the drive clutch. In this way, by making certain adjustments until these measurements were within given tolerances, both "parallelism" and "offset", equivalent to the second and third forms of alignment mentioned above, were assured. Parallelism was assured, however, only in the direction joining the axes of rotation of the drive clutch and driven pulley, and not in the perpendicular direction.

United States Patents which may be considered relevant to this application include U.S. Pat. No. 3,359,642 to Jessen; No. 2,821,788 to Wendt; No. 2,059,407 to Spase; No. 1,554,610 to Webster; No. 1,984,231 to Parker; No. 2,067,442 to Frisz; No. 2,711,935 to Miles; No. 978,177 to Locke and No. 1,410,432 to Wallin. However, none of these patents reveals a clutch adjusting tool resembling that of the present invention.

SUMMARY OF THE INVENTION

This invention provides the tool for aligning sheaves and the like rotatable about spaced-apart parallel axes of rotation. The tool comprises: an elongate member for extending between two sheaves generally perpendicular to the the axes of rotation; first contacting means generally near a first end of the elongate member for contacting a first said sheave; and second contacting means generally near a second end of the elongate member for contacting a second said sheave. The second contacting means comprises at least two gauge members extending from one side of the elongate member. Each gauge member comprises indicating means for indicating a distance between the elongate member and the second sheave, so that, when the first contacting means contacts the first sheave, and the second contacting means contacts the second sheave and each indicating means indicates said distance, the sheaves are aligned.

The tool may comprise three gauge members spaced apart as the vertices of a triangle.

The gauge members may each comprise a rod, the rods being generally parallel and the indicating means indicating distances along the rods.

Preferably, the elongate member has axle positioning means generally near one end for positioning an axle member of one said sheave and an edge generally near the other end of the elongate member for resting against the axle member of another said sheave.

In a preferred form, the tool comprises axle position indicating means comprising a fourth rod slidable within a guide on the elongate member in a direction generally perpendicular to the axle member of said another sheave. The guide and fourth rod are positioned below the edge of the elongate member so that one end of the fourth rod can rest against the axle member of said another sheave. Markings on the fourth rod indicate a length of the fourth rod extended when one end of the fourth rod contacts the axle member of said another sheave. The axes of the two sheaves are spaced-apart within given tolerances when the length of the fourth rod is indicated by the markings.

When compared with previous tools and methods for aligning the drive clutch and driven pulley of snowmobiles, the present invention offers several advantages. By using a tool according to an embodiment of the invention, the clutch and pulley can be completely aligned by using one tool and with a single position of the tool. There is no need to use separate measuring instruments and, in fact, no measurements at all need be taken. Moreover, a tool according to an embodiment of the invention allows a more complete alignment of the pulley and clutch than would possible with previous methods. For example, parallelism may be obtained in the direction perpendicular to a line joining the axes of rotation of the clutch and pulley. At least for some snowmobiles, this aspect of alignment was not previously practical.

In drawings which illustrate embodiments of the invention:

FIG. 1 is an isometric view of a tool for aligning sheaves and the like according to an embodiment of the invention;

FIG. 2 is an isometric view of the tool as shown in FIG. 1 in position on a snowmobile drive clutch and driven pulley;

FIG. 3 is a side elevational view of the tool shown in FIG. 1 with a snowmobile clutch and driven pulley shown in broken lines;

FIG. 4 is a top plan view of the tool, clutch and pulley as shown in FIG. 3;

FIG. 5 is top plan view of a portion of a tool as shown in FIG. 1 illustrating an alternative form of gauge member; and FIG. 6 is a top plan view similar to FIG. 5 and showing a further alternative form of gauge member.

DESCRIPTION OF THE PREFERRED EMBODIMENTS

The portions of the snowmobile drive train illustrated and described do not form part of the present invention. It should also be understood that the embodiments of the invention described below are adapted for use on an Arctic Cat TM snowmobile and modifications within the scope of the invention can be made to provide a tool suitable for other snowmobiles or other similar mechanical systems employing two or more sheaves or the like. In many cases, only dimensions of the tool need be changed.

FIGS. 1 to 4 illustrate a tool for aligning sheaves and the like rotatable about spaced-apart parallel axes of rotation according to a first embodiment of the invention.

The tool 2 comprises an elongate member 4 for extending between two sheaves, such as drive clutch 6 and driven pulley 8, perpendicular to their respective axes of rotation 10 and 12. Elongate member 4 is a flat elongate bar with parallel surfaces 14 and 16. A lateral projection 18 is provided to a first on top side of the bar and near a first end 20 of the bar. First, second and third spaced-apart lateral projections 22, 24 and 26 extend from a second or bottom side of the bar. First projection 22 is adjacent first end 20 of the bar and third projection 26 is furthest from end 20. Second projection 24 is between first projection 22 and third projection 26. Lateral projections 18, 22 and 26 are provided with apertures 28, 30 and 32 respectively passing through member 4 perpendicularly to surfaces 14 and 16. Elongate member 4 has a first straight edge 34 near a second end 36. Straight edge 34 is to the same side of member 4 as first, second and third lateral projections 22, 24 and 26. Member 4 also has an inside corner 38 generally near first end 20. The inside corner 38 is defined by a second straight edge 40 colinear with the first straight edge 34 and a third straight edge 42 perpendicular to the second straight edge 40 and comprising a side of second lateral projection 24 facing the first lateral projection 22.

Tool 2 includes three gauge members 44, 46 and 48. Gauge members 44, 46 and 48 comprise rods 50, 52 and 54, slidable through apertures 28, 30 and 32 respectively of elongate member 4. Rods 50, 52 and 54 are spaced apart like the vertices of a triangle and extend from side 14 of elongate member 4 as well as from side 16 of elongate member 4. Rods 50, 52 and 54 are generally the same length and are provided with flat round heads 56, 58 and 60 respectively at the end of each rod projecting beyond surface 14 of elongate member 4.

A pin 62 is received in an aperture of each of the rods 50, 52 and 54 near the ends opposite heads 56, 58 and 60. Heads 56, 58 and 60 and pins 62 prevent the ends of the rods 50, 52 and 54 from passing through apertures 28, 30 and 32.

Referring to FIG. 4, each of the rods 50, 52 and 54 is provided with a pair of circular markings 64 and 66 enscribed on the surface thereof. The marks 64 and 66 of each rod are spaced the same distance from heads 56, 58 and 60 as the corresponding marks 64 and 66 on the other rods. Furthermore, the marks 64 and 66 are spaced the same distance apart on each rod.

The tool 2 also has a fourth rod 68 which is longer than rods 50, 52 and 54. Rod 68 is located on the same side of elongate member 4 as projections 22, 24 and 26. Rod 68 is slidable through central bore 70 of sleeve 72 connected to third projection 26 of elongate member 4. Sleeve 72 and central bore 70 are parallel to surfaces 14 and 16 and straight edge 34 of elongate member 4. Pin 74 is received in an aperture of end 75 of rod 68 to prevent it from passing through bore 70 of sleeve 72. The other end 76 of rod 68 extends towards end 36 of elongate member 4. A circular mark 78 is enscribed on the surface or rod 68 a given distance from end 76.

FIG. 5 illustrates an alternative embodiment of the invention using another form of gauge member 81. Here the rod 82 is provided with a flat head 84 and is press fitted through aperture 86 of elongate member 87 corresponding to elongate member 4. Since rod 82 cannot slide through aperture 86, collar 88 is slidable on rod 82 and provided with a circular flange 90. A pair of circular engraved markings 92 and 94 on rod 82 indicate positions of end 96 of collar 88 along rod 82. Pin 98 is received in an aperture in end 99 of rod 82 opposite head 84 to prevent collar 88 from sliding off the end of rod 82.

FIG. 6 illustrates another embodiment of the invention wherein the gauge member 100 comprises a rod 102 with a head 104 press fitted through aperture 106 of elongate memmber 108. Circular engraved markings 112 and 114 indicate distances along rod 102 from surface 110 of elongate member 108.

The operation and use of the embodiments of the invention is illusrated in FIGS. 2, 3 and 4. Tool 2 is used to align drive clutch 6 and driven pulley 8 of a snowmobile (not shown). Driven pulley 8 is mounted on a chain case 9.

Drive clutch 6 comprises two half sections 116 and 118 separated by a hexagonal axle member 120. Section 116 is provided with a circular peripheral edge 122. Driven pulley 8 also comprises two half sections 124 and 126 connected by axle member 128. During the operation of the snowmobile, halves 116 and 118 of drive clutch 6 move towards and away from each other, as do halves 124 and 126 of driven pulley 8. In the stationary condition shown in FIGS. 2 to 4, halves 116 and 118 of drive clutch 6 are held furthest apart and has 124 and 126 of driven pulley 8 are pressed together.

In order to align clutch 6 and pulley 8 using tool 2, end 36 of elongate member 4 is forced between flat annular surfaces 130 and 132 of driven pulley 8. Surfaces 14 and 16 of elongate member 4 adjacent end 36 provide means for contacting flat surfaces 130 and 132 of driven pulley 8. Because halves 124 and 126 are biased towards each other, end 36 of tool 2 can be forced between halves 124 and 126 until edge 34 contacts axle member 128. Surfaces 14 and 16 extend forwardly towards drive clutch 6 parallel to planes 134 and 136 defined by surfaces 130 and 132 of driven pulley 8. Consequently, elongate member 4 extends towards drive clutch 6 perpendicular to axis of rotation 12 of driven pulley 8. This can best be seen in FIG. 4.

As best seen in FIG. 3, rods 50, 52 and 54 are spaced apart along a semi-circular curve along the top half of circular edge 122 of drive clutch 6 with a radius slightly larger than the circular edge 122. Consequently, rods 50, 52 and 54 contact circular edge 122 simultaneously when end 20 of elongate member 4 is positioned as shown in FIGS. 2 and 4. After rods 50, 52 and 54 are positioned as shown, they are moved through apertures 28, 30 and 32 until flat heads 56, 58 and 60 rest against half 116 of drive clutch 8. Rods 50, 52 and 54 should be somewhat loose in apertures 28, 30 and 32 so end 36 of tool 2 will not spread apart half sections 124 and 126 of driven pulley 8 if drive clutch 6 and driven pulley 8 are not aligned.

With tool 2 positioned as shown in FIGS. 1 to 4, the driving clutch 6 and driven pulley 8 are properly aligned for "parallelism" and "offset" when rods 50, 52 and 54 extend from elongate member 4 so that surface 14 of elongate member 4 is positioned along each of the rods somewheres between marks 64 and 66. "Parallelism" is defined as meaning that planes 134 and 136, defined by flat opposing surfaces 130 and 132 of driven pulley 8, are parallel within given tolerances with plane 138 defined by circular edge 122 of drive clutch 6. "Offset" is defined as being the distance, within given tolerances, in a direction parallel to the axes of rotation 10 and 12 between given points on the drive clutch 6 and the driven pulley 8. In this case, the distance is distance 139 between plane 134, defined by flat surface 130 of driven pulley 8, and plane 138 defined by circular edge 122 of drive clutch 6. If rods 50, 52 and 54 do not all coincide with the surface 14 of elongate member 4 somewheres between marks 64 and 66, then known adjustments to the dirve mechanism of the snowmobile are made until this condition is meet. For example, in some snowmobiles, the offset is corrected by adjusting driven pulley 8 alongs its axis of rotation 12. Parallelism can be corrected, for example, by loosening lock nuts holding the motor mount of the snowmobile and inserting shims until parallelism is obtained. These are only examples and the actual method of correction depends on the particular model of snowmobile.

In addition to assuring "parallelism" and "offset" as defined above, tool 2 can be used to measure and adjust the distance between axis of rotation 10 of drive clutch 6 and axis of rotation 12 of driven pulley 8. As seen best in FIG. 3, when rods 50, 52 and 54 rest upon circular edge 122 of drive clutch 6, hexagonal axle member 120 of drive clutch 6 is positioned within inside corner 38 of elongate member 4 and with a flat resting against straight edge 40. With straight edge 34 of elongate member 4 resting against axle member 128 of driven pulley 8, rod 68 is adjusted until end 76 contacts axle member 128. Mark 78 is positioned on rod 68 so that it coincides with edge 27 of projection 26 when axle members 120 and 128 are spaced apart as required.

The alternative gauge members illustrated in FIGS. 5 and 6 may be substituted for gauge members 44, 46 and 48 shown in FIGS. 1 to 4. In the case of the embodiments shown in FIG. 5, flange 90 of collar 88 is placed against circular edge 122 of drive clutch 6. When the opposite end 96 of collar 88 is aligned between marks 92 and 94 on rod 82 for three such gauge members arranged as shown in FIGS. 1 to 4, parallelism and offset are within tolerances. For the embodiment shown in FIG. 6, there is no sliding portion of gauge member 100. In this case, three such gauge members 100 are positioned in place of gauge members 44, 46 and 48. Parallelism and offset are within tolerances when edge 122 of drive clutch 6 is positioned between marks 112 and 114 and contacts all three rods 102.

As mentioned, tool 2 can be modified for the particular requirements of another snowmobile drive mechanism or for other such arrangements of two or more sheaves or the like. Such modifications are still within the scope of this invention.

While tool 2 employs three gauge members 44, 46, 48, "parallelism" as established by earlier methods of alignment, for example, in the maintenance manual of Arctic Cat (Trade Mark) snowmobiles, can be achieved by employing a tool similar to tool 2 but omitting gauge member 44.

Interchangeable gauge members could be provided for tool 2 to adapt it for different models of snowmobiles. Similarly interchangeable rods 68 can be provided.

What I claim is:

1. A tool for aligning sheaves and the like rotatable about spaced-apart parallel axes of rotation, the tool comprising:

an elongate member for extending between two sheaves generally perpendicular to the axes of rotation;

first contacting means generally near a first end of the elongate member for contacting a first said sheave; and second contacting means generally near a second end of the elongate member for contacting a second said sheave comprising three gauge members spaced apart as the vertices of a triangle and extending from one side of the elongate member, each gauge member comprising indicating means for indicating a distance between the elongate member and the second sheave, so that, when the first contacting means contacts the first sheave, and the second contacting means contacts the second sheave and each indicating means indicates said distance, the sheaves are aligned.

2. A tool as claimed in claim 1, the gauge members each comprising a rod, the rods being generally parallel and the indicating means indicating distances along the rods.

3. A tool as claimed in claim 2, the first contacting means comprising a first flat surface of the elongate member for contacting a flat surface of the first sheave.

4. A tool as claimed in claim 3, each rod extending from the elongate member in a direction perpendicular to the first flat surface and being centered on a semi-circular curve with a radius such that all three rods can simultaneously contact a circular edge of the second sheave, the indicating means indicating the distance between the elongate member and the circular edge along each rod.

5. A tool as claimed in claim 4, each rod being slidable in said direction and having a flat head at the same end of each rod for placing against the second sheave to one side of the circular edge, the indicating means being markings on each rod to indicate a length of rod extended from a side of the elongate member facing the circular edge, a first plane including said flat surface of the first sheave and a second plane including the circular edge of the second sheave being parallel and spaced-apart within given tolerances when the markings indicate said length of said rods extended.

6. A tool as claimed in claim 5, the rods being generally equal in length and extending from a second flat surface of the elongate member parallel to said first flat surface.

7. A tool as claimed in claim 1 or claim 5, the elongate member having axle positioning means generally near one end for positioning an axle member of one said sheave and a first edge generally near another end of the elongate member for resting against an axle member of another said sheave.

8. A tool as claimed in claim 7, comprising axle position indicating means connected to the elongate member for indicating a distance between the axle members of the two sheaves.

9. A tool as claimed in claim 8, the axle position indicating means comprising a fourth rod slidable within a guide on the elongate member in a direction generally parallel to the first edge, the guide and fourth rod being positioned a distance from said first edge of the elongate member so that one end of the fourth rod can rest against the axle member of said another sheave, markings on the fourth rod to indicate a length of the fourth rod extended when the one end of the fourth rod contacts said axle member of said another sheave, the axes of the two sheaves being spaced-apart within given tolerances when said length of the fourth rod is indicated by said markings.

10. A tool as claimed in claim 9, said another sheave being said first sheave and the axle positioning means being an inside curve along the elongate member.

11. A tool for aligning a snowmobile clutch and driven pulley where the clutch and the pulley are each rotatable about spaced-apart generally parallel axes and each comprises two halves movable towards and away from each other along axle members, the driven pulley having opposed planar surfaces parallel to the axis of rotation, the clutch having a circular edge concentric with the axis of rotation, the clutch and pulley being aligned when the axes of rotation are spaced-apart within given tolerances and a first plane through the circular edge of the clutch and a second plane along one said planar surface of the pulley are parallel and spaced-apart within given tolerances, the tool comprising:

a flat elongate bar with two parallel surfaces, a lateral projection near a first end of the bar from a top side of the bar and first, second and third spaced-apart lateral projections near the first end of the bar from a bottom side of the bar, the first projection being adjacent the first end of the bar, the third projection being furthest from the first end of the bar and the second projection being therebetween, the lateral projection to the top side of the bar and the first and third lateral projections to the bottom side of the bar having apertures passing through the bar perpendicular to the surfaces of the bar, a first straight edge of the bar being on the bottom side of the bar near a second end of the bar and extending towards the first end of the bar, an inside corner generally near the first end of the bar being defined by a second straight edge generally colinear with the first straight edge and a third straight edge perpendicular to the second straight edge comprising a side of the second lateral projection facing the first lateral projection;

first, second and third rods, each rod passing slidably through one of said apertures perpendicularly to the surfaces of the bar, having a flat head at a first end, the first end of each rod extending through one said aperture beyond one said surface of the bar, the rods being generally the same length and having two adjacent markings indicating given distances along the rod from the flat head, each rod having means near a second end for preventing the second end from passing through the one aperture, the three rods being spaced apart along a semi-circular curve with a radius slightly larger than the radius of the circular edge of the clutch; and a fourth rod spaced from the bottom side of the bar and generally parallel to the first straight edge, the fourth rod being slidable within a sleeve connected to the bar on the third projection of the bar, the fourth rod having a first end generally near the second end of the bar and a second end near the second projection, the fourth rod having means near the second end for preventing the second end from passing through the sleeve and having a mark on the bar for indicating a length of bar extended from the sleeve towards the first end of the bar.

* * * * *

UNITED STATES PATENT AND TRADEMARK OFFICE
CERTIFICATE OF CORRECTION

PATENT NO. : 4,212,111

DATED : July 15, 1980

INVENTOR(S) : Stanley Taumo Saari

It is certified that error appears in the above—identified patent and that said Letters Patent is hereby corrected as shown below:

Column 1, Line 26, after "acts" insert -- as --. Column 2, Line 61, after "would" insert -- be --. Column 3, Line 40, change "on" to -- or --. Column 4, Line 40, change "memmber" to -- member --; Line 44, change "illusrated" to -- illustrated --; Line 57 after "has" insert -- halves --. Column 5, Line 24, change "somewheres" to -- somewhere --; Line 37, change "somewheres" to -- somewhere --; Line 38, change "dirve" to -- drive --; Line 39, change "meet" to -- met --; Line 41, change "alongs" to -- along --; Line 54, after "flat" insert -- edge --. Column 6, Line 13, after "46" insert -- and --.

Signed and Sealed this

Eleventh Day of November 1980

[SEAL]

Attest:

Attesting Officer

SIDNEY A. DIAMOND

Commissioner of Patents and Trademarks